(12) United States Patent
Larson

(10) Patent No.: US 7,461,853 B1
(45) Date of Patent: Dec. 9, 2008

(54) TRAILER MOUNTED BOAT HULL SHIELD

(76) Inventor: Wayne A. Larson, 8310 Frase Rd., Fall Creek, WI (US) 54742

(*) Notice: Subject to any disclaimer, the term of this patent is extended or adjusted under 35 U.S.C. 154(b) by 383 days.

(21) Appl. No.: 11/433,168

(22) Filed: May 15, 2006

(51) Int. Cl.
*B60P 3/10* (2006.01)

(52) U.S. Cl. ............... 280/414.1; 280/847; 280/152.3; 280/155; 280/768; 280/770; 296/180.4; 114/361; 40/591

(58) Field of Classification Search ............. 280/414.1, 280/155, 768, 770, 847, 152.3; 114/361; 296/180.4; 40/591
See application file for complete search history.

(56) References Cited

U.S. PATENT DOCUMENTS

| | | | |
|---|---|---|---|
| 2,640,714 A | 6/1953 | Garner et al. | |
| 2,865,655 A | 12/1958 | Boysen | |
| 3,058,757 A | 10/1962 | Sullivan | |
| 3,746,366 A | 7/1973 | Bruce et al. | |
| 3,987,863 A | 10/1976 | Mittendorf et al. | |
| 4,138,130 A * | 2/1979 | Pickrell et al. | ............. 280/851 |
| 4,157,200 A * | 6/1979 | Johnson | ....................... 280/770 |
| 4,706,991 A | 11/1987 | Miller | |
| 4,781,392 A | 11/1988 | Cooper | |
| 4,810,015 A | 3/1989 | McNeil | |
| 4,840,400 A | 6/1989 | Greenleaf | |
| 4,936,599 A | 6/1990 | McNamee | |
| 4,966,378 A | 10/1990 | Cook | |
| 4,997,229 A | 3/1991 | Swanson | |
| 5,058,946 A | 10/1991 | Faber | |
| 5,072,963 A | 12/1991 | Avillez de Basto | |
| 5,181,734 A | 1/1993 | Brown | |
| 5,273,316 A | 12/1993 | Infante | |
| 5,480,174 A * | 1/1996 | Grenier | ................... 280/414.1 |
| 5,481,999 A | 1/1996 | Clark | |
| 5,762,374 A * | 6/1998 | Grove et al. | ................. 280/847 |
| 6,076,847 A * | 6/2000 | Thornton | ..................... 280/477 |
| 6,109,639 A | 8/2000 | Blassingame et al. | |
| 6,196,587 B1 | 3/2001 | Sage | |
| 6,361,061 B1 | 3/2002 | Lea | |
| 6,402,228 B1 * | 6/2002 | Chaffin | ..................... 296/180.4 |
| 6,616,188 B1 | 9/2003 | Jefferies et al. | |
| 2003/0189312 A1 * | 10/2003 | McNamee | ............... 280/414.1 |

* cited by examiner

*Primary Examiner*—Joanne Silbermann
*Assistant Examiner*—Marlon A Arce Diaz
(74) *Attorney, Agent, or Firm*—Tipton L. Randall

(57) ABSTRACT

A boat hull shield device comprising a bracket member attached to the tongue of a trailer. An adjustable shield-support assembly is fastened to the bracket member and extending upwardly therefrom. A pair of planar shield members is adjustably attached to the shield support assembly, with the shield members each positioned to one side of the bracket member in an open V configuration. A pair of linear brace members further stabilizes the shield members. Each brace member is secured at a first end to one shield member and at a second end to the upright support fastened to the tongue of the trailer. The planar shield members are rotationally adjustable relative to a horizontal axis, which is perpendicular to the trailer tongue and pivotally adjustable relative to a vertical axis, that is perpendicular to the trailer tongue.

20 Claims, 4 Drawing Sheets

TRAILER MOUNTED BOAT HULL SHIELD

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to protective shields and, more particularly, to protective shields for use in preventing damage to the hull of a boat and, most particularly, to a protective shields assembly mounted to a boat trailer for preventing damage to the hull of a boat during transport behind a towing vehicle.

2. Background Information

Boating is an increasingly popular recreational activity for many individuals. Although an individual can maintain a pleasure boat at a mooring or a marina on a river, lake or ocean, many prefer to remove the boat from the water on a boat trailer and store the boat and trailer at a safe location between uses. With the boat secured atop a boat trailer, the boat is easily transported to many different locations using a towing vehicle.

However, during transport, the towing vehicle continually causes road debris to be thrown into the air and fly directly at the boat being towed directly behind the vehicle. The debris impacts on the forward surfaces of the boat hull, causing discoloration and physical damage to the boat hull. Small rocks and pebbles are the most destructive form of debris and are particularly destructive to boat hulls fabricated from fiberglass reinforced resin material, commonly used in many boats.

Numerous devices have been devised to overcome the problem of protecting items towed behind a motor vehicle. Patents have been granted on some of these devices, including the following. U.S. Pat. No. 2,640,714 by Garner et al.; U.S. Pat. No. 2,865,655 by Boysen; U.S. Pat. No. 3,058,757 by Sullivan; U.S. Pat. No. 3,746,366 by Bruce et al.; U.S. Pat. No. 3,987,863 by Mittendorf et al.; U.S. Pat. No. 4,138,130 by Pickrell et al.; U.S. Pat. No. 4,157,200 by Johnson; U.S. Pat. No. 4,706,991 by Miller; U.S. Pat. No. 4,781,392 by Cooper; U.S. Pat. No. 4,810,015 by McNeil; U.S. Pat. No. 4,840,400 by Greenleaf; U.S. Pat. No. 4,936,599 by McNamee; U.S. Pat. No. 4,966,378 by Cook; U.S. Pat. No. 4,997,229 by Swanson; U.S. Pat. No. 5,058,946 by Faber; U.S. Pat. No. 5,072,963 by Avillez de Basto; U.S. Pat. No. 5,181,734 by Brown; U.S. Pat. No. 5,273,316 by Infante; U.S. Pat. No. 5,480,174 by Grenier; U.S. Pat. No. 5,481,999 by Clark; U.S. Pat. No. 5,762,374 by Grove et al.; U.S. Pat. No. 6,109,639 by Blassingame et al.; U.S. Pat. No. 6,796,587 by Sage; U.S. Pat. No. 6,361,061 by Lea, and U.S. Pat. No. 6,616,188 by Jefferies et al. Applicant has devised a boat hull shield device that is particularly designed for securing to a standard boat trailer. The boat hull shield device provides shields to protect the boat hull from flying debris, with the shields being completely adjustable to provide protection to boat hulls of various sizes and shapes.

SUMMARY OF THE INVENTION

The invention is directed to a hull shield device comprising a bracket member adapted for attachment to the tongue of a trailer. An adjustable shield-support assembly is fastened to the bracket member and extending upwardly therefrom. A pair of planar shield members is adjustably attached to the shield support assembly, the shield members each positioned to one side of the bracket member in an open V configuration. A pair of linear brace members further stabilizes the shield members. Each brace member is secured at a first end to one shield member and at a second end to the upright support fastened to the tongue of the trailer. The planar shield members are rotationally adjustable relative to a horizontal axis, which is perpendicular to the trailer tongue and pivotally adjustable relative to a vertical axis that is perpendicular to the trailer tongue.

In a preferred embodiment of the invention, the adjustable shield-support assembly includes a base support member extending from the bracket member and a double spline connector member, which is attached opposite the bracket member. A pair of L-shaped, connector rod members is fastened to the double spline connector member. Each L-shaped, connector rod member is secured at a first leg end to one end of the double spline connector member and at a second leg end to a shield member. Each L-shaped, connecting rod member includes a single spline member, thereby providing pivotal adjustment of the shield member relative to a vertical axis perpendicular to the trailer tongue.

DESCRIPTION OF THE EMBODIMENTS

Figure 1:
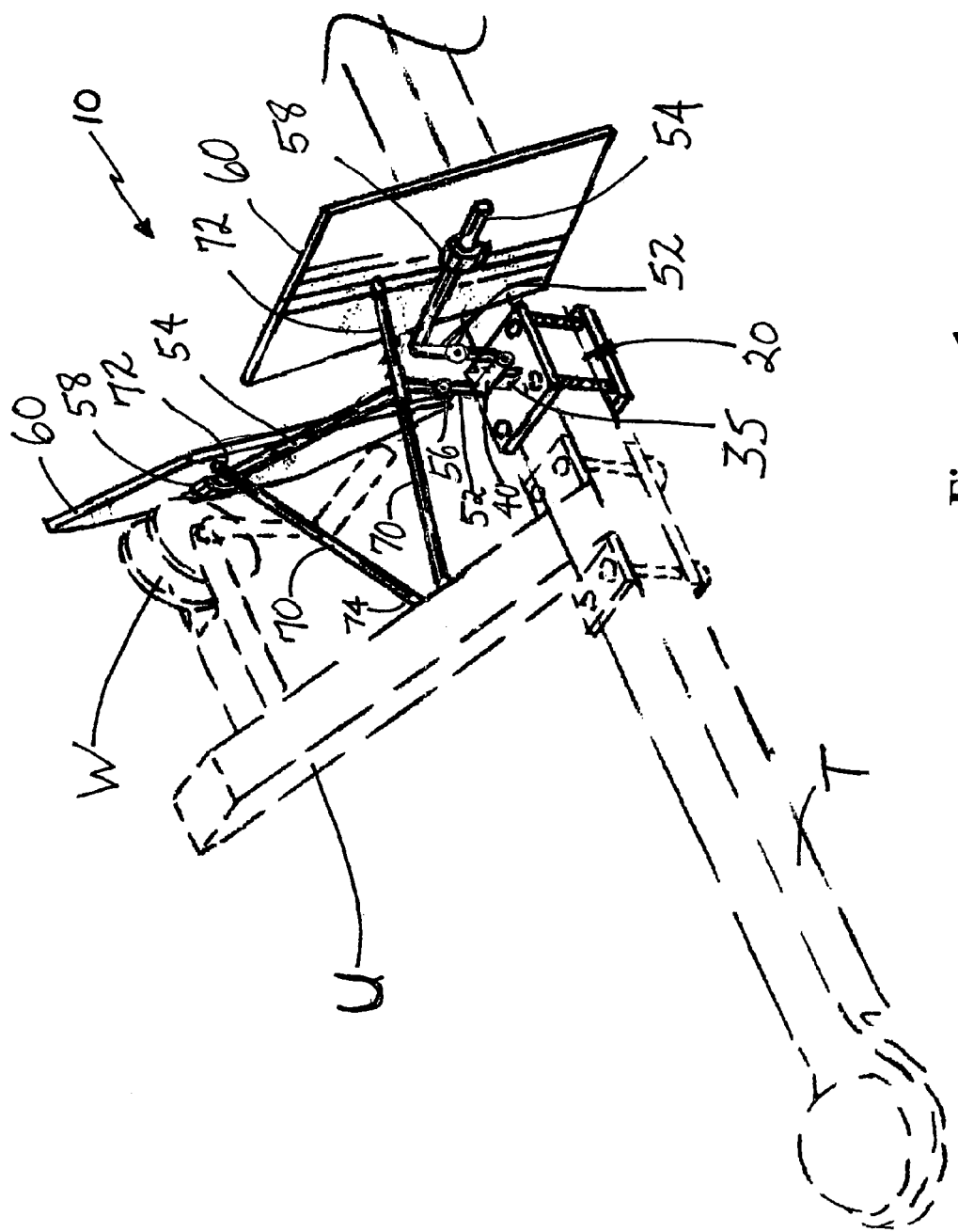
FIG. 1 is a perspective view of the trailer mounted, boat hull shield device of the present invention.

| | Nomenclature |
|---|---|
| 10 | Trailer Mounted Boat Hull Shield Device |
| 20 | Bracket Member |
| 30 | Shield-Support Assembly |
| 35 | Base Support Member |
| 40 | Double Spline Connector Member |
| 42 | Center Section of Double Spline Connector Member |
| 44 | End Sections of Double Spline Connector Member |
| 46 | Bolt and Nut Member of Spline Connector Member |
| 50 | L-Shaped Connector Rod Members |
| 52 | First Leg of Connector Rod Member |
| 54 | Second Leg of Connector Rod Member |
| 56 | Single Spline Connector-Member |
| 58 | Bracket Member on Shield Member |
| 60 | Planar Shield Member |
| 62 | First Side of Shield Member |
| 64 | Second Side of Shield Member |
| 70 | Linear Brace Members |
| 72 | First End of Brace Member |

-continued

Nomenclature

| | |
|---|---|
| 74 | Second End of Brace Member |
| T | Tongue of Boat Trailer |
| U | Upright Support for Winch |
| W | Winch |
| X | Horizontal Axis |
| Y | Vertical Axis |

Construction

Nearly all boat trailers include a frame with at least one pair of wheels mounted near the rear of the frame and a tongue T extending forward from the frame. The frame includes various rollers or bunks that support the boat. The tongue T has a hitch at the end opposite the frame for connecting the trailer to a towing vehicle. Additionally, there is an upright support U, extending from the tongue T, for mounting a hand winch W (or a power winch) to pull the boat onto the trailer from the water. The upright support U can be welded directly to the tongue T or connected to the tongue T by means of a bracket or similar device that bolts to the trailer tongue T. Commonly, there is a telescoping support fastened to the trailer tongue T near the hitch, which has a single caster wheel for supporting the trailer tongue T above the ground when not hitched to a towing vehicle.

The invention is a trailer mounted, boat hull shield device. The hull shield device comprises a bracket member, adapted for attachment to the tongue of a trailer. An adjustable, shield-support assembly is fastened to the bracket member and extending upwardly therefrom. A pair of planar shield members is adjustably attached to the shield support assembly, with the shield members each positioned to one side of the bracket member in an open V configuration. A pair of linear brace members further stabilizes the shield members. Each brace member is secured at a first end to one shield member and at a second end to the upright support, which is fastened to the tongue of the trailer. The planar shield members are rotationally adjustable relative to a horizontal axis, which is perpendicular to the trailer tongue and pivotally adjustable relative to a vertical axis, that is perpendicular to the trailer tongue.

In a preferred embodiment of the invention, the adjustable shield-support assembly includes a base support member, extending from the bracket member with a double spline connector member attached opposite the bracket member. A pair of L-shaped, connector rod members is fastened to the double spline connector member. Each L-shaped, connector rod member is secured at a first leg end to one end of the double spline connector member and at a second leg end to a shield member. Each L-shaped connecting rod member includes a single spline member, providing pivotal adjustment of the shield member relative to a vertical axis that is perpendicular to the trailer tongue.

Figure 2:
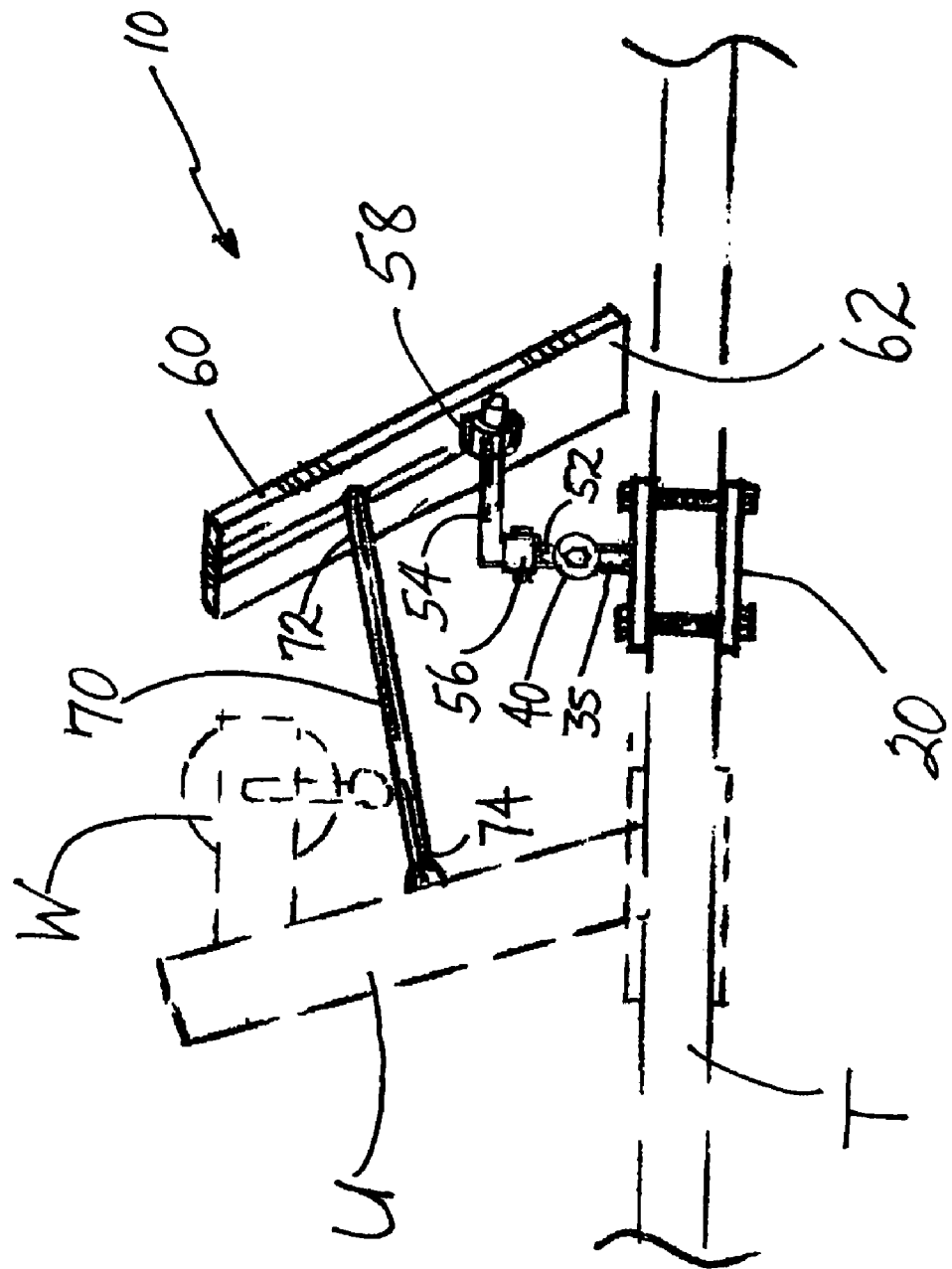
FIG. 2 is a perspective side view of the trailer mounted, boat hull shield device of the present invention.
Figure 3:
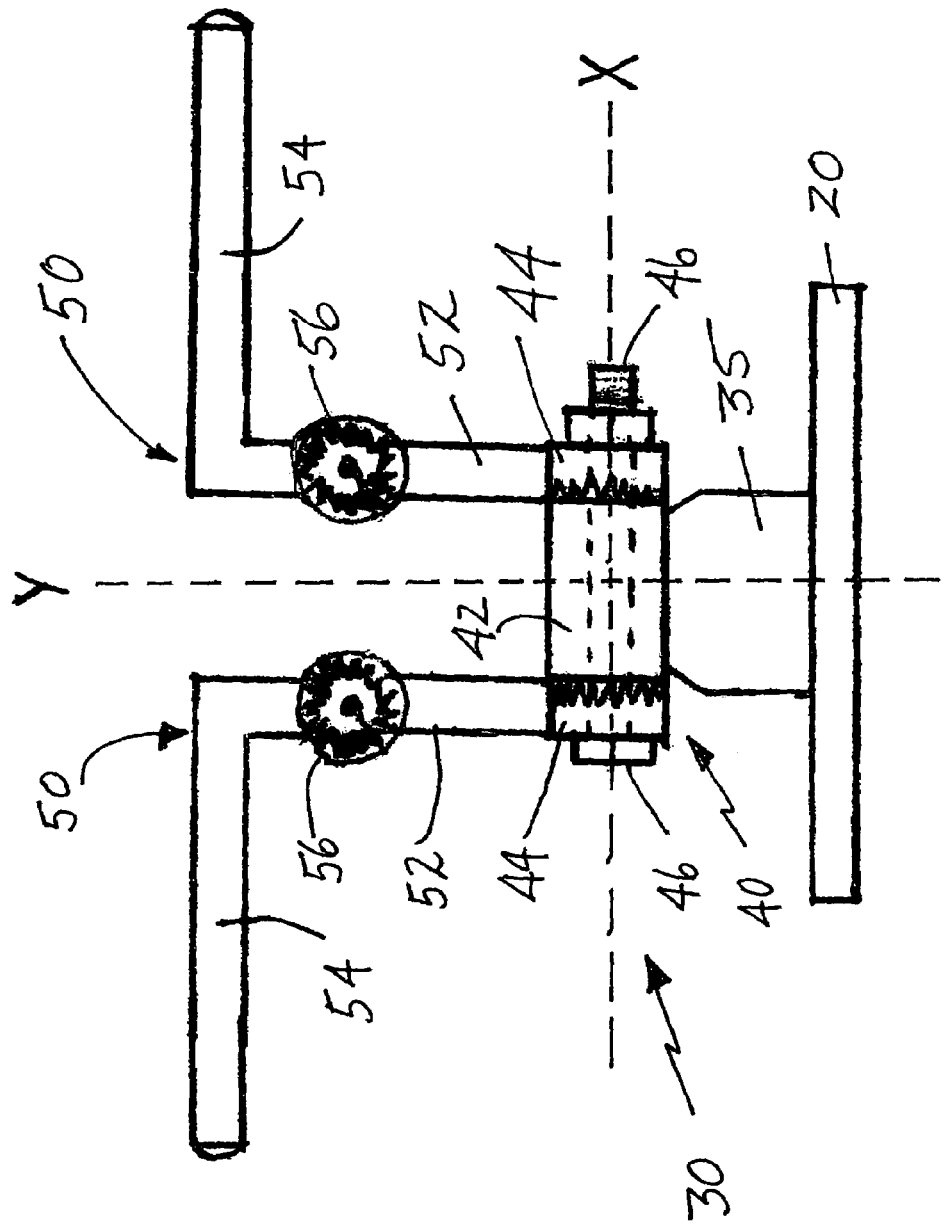
FIG. 3 is a front view of the adjustable shield-support assembly of the trailer mounted, boat hull shield device of the present invention.
Figure 4:
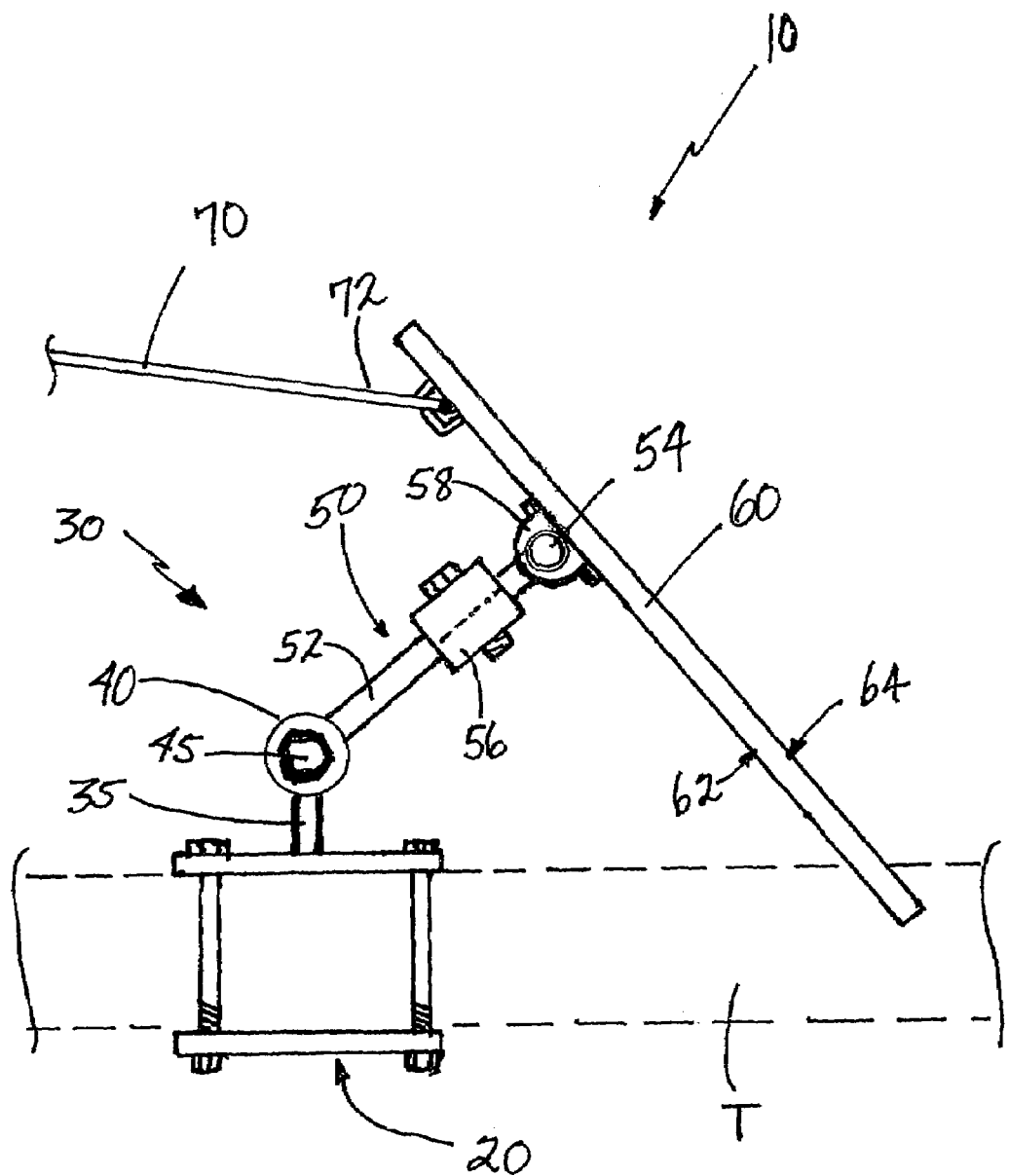
FIG. 4 is an enlarged perspective view of the trailer mounted, boat hull shield device of the present invention.

Referring now to FIGS. 1, 2 and 4, several perspective views of the trailer mounted, boat hull shield device 10 secured to a boat trailer are shown. FIG. 3 provides as detailed view of the adjustable shield-support assembly 30. The boat trailer is shown in phantom in FIGS. 1, 2 and 4. The hull shield device 10 comprises a bracket member 20 adapted for attachment to the tongue T of a boat trailer. The bracket member 20 is shown as having top and bottom plates with connecting bolts therebetween, although other configurations for bracket member 20 are contemplated with equivalent results. As shown in FIGS. 3 and 4, an adjustable shield-support assembly 30 is fastened to the bracket member 20 and extends upwardly therefrom. The adjustable shield-support assembly 30, preferably, includes a base support member 35, extending from the bracket member 20 with a double spline connector member 40 attached opposite the bracket member 20. The double spline connector member 40 includes a cylindrical center section 42, rigidly secured to the base support member 35 with cylindrical end sections 44 secured to the center section 42 by a bolt and nut member 46 passing through all three sections. The double spline connector member 40 and bolt and nut member 46 are oriented perpendicular to the linear trailer tongue T. The contact areas between the center section 42 and each end section 44 includes stepped or splined surfaces, such that tightening the bolt and nut member 46 applies pressure between the sections 42, 44, thereby locking the orientation of the end sections 44 relative to the center section 42.

As illustrated in FIGS. 3 and 4, a pair of L-shaped, connector rod members 50 is fastened to the double spline connector member 40. Each L-shaped, connector rod member 50 is secured at an end of a first leg 52 to one of the end sections 44 of the double spline connector member 40 and at an end of a second leg 54 to a shield member 60. Each L-shaped, connecting rod member 50 includes a single spline member 56, providing pivotal adjustment of the shield member 60 relative to a vertical axis Y perpendicular to the trailer tongue T. The single spline member 56 includes two halves, with the contact area there between having stepped or splined surfaces, as described above. Tightening a bolt and nut member, which connects the two halves of the spline member 56, applies pressure to the contact area, thereby locking the relative orientation of the two halves. Preferably, the single spline member 56 is contained in the first leg 52 of each L-shaped, connector rod member 50. This allows pivoting of the second leg 54 and the attached shield member 60, relative to the first leg 52 of the L-shaped, connector rod member 50.

In FIGS. 1, 2 and 4, a bracket member 58 is secured to a first side 62 of the shield member 60, with the bracket member 58 encircling the end of the rod member's second leg 54. The bracket member 58 provides for adjustment of the orientation of the shield member 60 relative to the connected second leg 54. Other devices for attaching the connector rod member 50 to the shield member 60 are contemplated, with equivalent results.

The pair of planar shield members 60 is adjustably attached to the shield support assembly 30, with the shield members 60 each positioned to one side of the bracket member 20 in an open V configuration. A pair of linear brace members 70 further stabilize the shield members 60. Each brace member 70 is secured at a first end 72 to one shield member 60 and at a second end 74 to the upright support U fastened to the tongue T of the trailer.

Preferably, the planar shield members 60 are rectangular with the second leg 54 of the L-shaped, connector rod member 50 secured near a horizontal center line of the shield member 60. Most preferably, the rectangular, planar, shield members 60 have a width of about 18 inches to about 24 inches and a length of about 24 inches to about 48 inches. It is preferred that the shield members 60 are fabricated from a corrosion resistant material, such as aluminum or steel alloy for strength and durability. Additionally, it is preferred that the planar shield members 60 extend below the tongue T of the boat trailer to prevent debris from striking the bottom of the boat hull.

In order to provide for maximum adjustability of the planar shield members 60, each linear brace member 70 is attached at a first end 72 to the shield member 60 at a point above the second leg 54 of the L-shaped, connector rod member 50. Additionally, each linear brace member 70 is adjustable in length, for example, telescopically adjustable, to provide support for each shield member 60 in a wide variety of orientations. Thus, the planar shield members 60 are rotationally adjustable relative to a horizontal axis X perpendicular to the trailer tongue T and pivotally adjustable relative to a vertical axis Y perpendicular to the trailer tongue T. The adjustability of the planar shield members 60 provides protection for a wide variety of boat hull shapes being transported on the boat trailer. The bracket member 20 anchoring the shield device 10 can be mounted at any desired location along the length of the trailer tongue T between the upright support U for the winch W and the boat hull itself.

While the invention has been particularly shown and described with reference to preferred embodiments thereof, it will be understood by those skilled in the art that various changes in form and details may be made therein without departing from the spirit and scope of the invention.

I claim:

1. A trailer mounted boat hull shield device comprising:
   a bracket member adapted for attachment to the tongue of a boat trailer;
   an adjustable shield-support assembly fastened to the bracket member and extending upwardly therefrom;
   a pair of planar shield members adjustably attached to the shield support assembly, the shield members each positioned to one side of the bracket member in an open V configuration; and
   a pair of linear brace members, each brace member secured at a first end to one shield member and at a second end to said boat trailer;
   whereby the planar shield members are rotationally adjustable relative to a horizontal axis perpendicular to the trailer tongue and pivotally adjustable relative to a vertical axis perpendicular to the trailer tongue.

2. The trailer mounted boat hull shield device of claim 1, wherein the shield support assembly includes a base support member extending from the bracket member with a double spline connector member attached opposite the bracket member, and a pair of L-shaped connector rod members, each L-shaped connector rod member secured at a first leg end to one end of the double spline connector member and at a second leg end to a shield member; each L-shaped connecting rod member including a single spline member providing pivotal adjustment of the shield member relative to a vertical axis perpendicular to the trailer tongue.

3. The trailer mounted boat hull shield device of claim 1, wherein the linear brace members are adjustable in length to accommodate various orientations of the attached shield members.

4. The trailer mounted boat hull shield device of claim 1, wherein each linear brace member is adapted for attachment at a second end to an upright support on said tongue of said boat trailer.

5. The trailer mounted boat hull shield device of claim 2, wherein each single spline member is contained in the first leg of each L-shaped connector rod member.

6. The trailer mounted boat hull shield device of claim 2, wherein the planar shield members are rectangular with the second leg of a L-shaped connector rod member secured near a horizontal center line of a shield member.

7. The trailer mounted boat hull shield device of claim 6, wherein each linear brace member is attached at a first end to the shield member at a point above the second leg of the L-shaped connector rod member.

8. The trailer mounted boat hull shield device of claim 6, wherein the rectangular, planar, shield members have a width of at least about 18 inches and a length of at least about 24 inches.

9. The trailer mounted boat hull shield device of claim 6, wherein the planar shield members extend below said tongue of said boat trailer.

10. A trailer mounted boat hull shield device comprising:
    a bracket member adapted for attachment to the tongue of a boat trailer;
    an adjustable shield-support assembly fastened to the bracket member and extending upwardly therefrom, the shield support assembly including a base support member extending from the bracket member with a double spline connector member attached opposite the bracket member, and a pair of L-shaped connector rod members, each L-shaped connector rod member secured at a first leg end to one end of the double spline connector member and at a second leg end to a shield member; each L-shaped connecting rod member including a single spline member providing pivotal adjustment of the shield member relative to a vertical axis perpendicular to the trailer tongue;
    a pair of planar shield members adjustably attached to the shield support assembly, the shield members each positioned to one side of the bracket member in an open V configuration; and
    a pair of linear brace members, each brace member secured at a first end to one shield member and at a second end to said boat trailer;
    whereby the planar shield members are rotationally adjustable relative to a horizontal axis perpendicular to the trailer tongue and pivotally adjustable relative to a vertical axis perpendicular to the trailer tongue.

11. The trailer mounted boat hull shield device of claim 10, wherein the linear brace members are adjustable in length to accommodate various orientations of the attached shield members.

12. The trailer mounted boat hull shield device of claim 10, wherein each linear brace member is adapted for attachment at a second end to an upright support on said tongue of said boat trailer.

13. The trailer mounted boat hull shield device of claim 10, wherein each single spline member is contained in the first leg of each L-shaped connector rod member.

14. The trailer mounted boat hull shield device of claim 10, wherein the planar shield members are rectangular with the second leg of a L-shaped connector rod member secured near a horizontal center line of a shield member.

15. The trailer mounted boat hull shield device of claim 14, wherein each linear brace member is attached at a first end to the shield member at a point above the second leg of the L-shaped connector rod member.

16. The trailer mounted boat hull shield device of claim 14, wherein the rectangular, planar, shield members have a width of at least about 18 inches and a length of at least about 24 inches.

17. The trailer mounted boat hull shield device of claim 14, wherein the planar shield members extend below said tongue of said boat trailer.

18. A trailer mounted boat hull shield device comprising:
    a bracket member adapted for attachment to the tongue of a boat trailer;
    an adjustable shield-support assembly fastened to the bracket member and extending upwardly therefrom, the shield support assembly including a base support member extending from the bracket member with a double spline connector member attached opposite the bracket member, and a pair of L-shaped connector rod members, each L-shaped connector rod member secured at a first leg end to one end of the double spline connector member and at a second leg end to a shield member; the first leg of each L-shaped connector rod member including a single spline connector member providing pivotal adjustment of the shield member relative to a vertical axis perpendicular to the trailer tongue;

a pair of planar shield members adjustably attached to the shield support assembly, the shield members each positioned to one side of the bracket member in an open V configuration; and a pair of linear brace members, each brace member secured at a first end to one shield member and at a second end to an upright support on said tongue of said boat trailer, the linear brace members adjustable in length to accommodate various orientations of the attached shield members;

whereby the planar shield members are rotationally adjustable relative to a horizontal axis perpendicular to the trailer tongue and pivotally adjustable relative to a vertical axis perpendicular to the trailer tongue.

19. The trailer mounted boat hull shield device of claim 18, wherein the planar shield members are rectangular with the second leg of a L-shaped connector rod member secured near a horizontal center line of a shield member.

20. The trailer mounted boat hull shield device of claim 19, wherein each linear brace member is attached at a first end to the shield member at a point above the second leg of the L-shaped connector rod member.

* * * * *